(12) United States Patent
Marshall et al.

(10) Patent No.: US 9,063,222 B2
(45) Date of Patent: Jun. 23, 2015

(54) ALMANAC MAINTENANCE FOR MOBILE STATION POSITIONING

(75) Inventors: Grant Alexander Marshall, Campbell, CA (US); Mark Leo Moeglein, Ashland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 12/789,926

(22) Filed: May 28, 2010

(65) Prior Publication Data

US 2011/0291885 A1    Dec. 1, 2011

(51) Int. Cl.
  *G01S 19/27* (2010.01)
  *G01S 19/05* (2010.01)
  *G01S 5/02* (2010.01)
  *G01S 19/25* (2010.01)

(52) U.S. Cl.
  CPC .............. *G01S 19/05* (2013.01); *G01S 19/258* (2013.01); *G01S 5/0236* (2013.01); *G01S 19/27* (2013.01)

(58) Field of Classification Search
  CPC ..... G01S 19/259; G01S 19/258; G01S 19/27; G01S 19/05; G01S 5/0236
  USPC ................................................... 342/357.66
  See application file for complete search history.

(56) References Cited

U.S. PATENT DOCUMENTS

| | | | |
|---|---|---|---|
| 5,663,734 A | 9/1997 | Krasner | |
| 7,450,064 B2 | 11/2008 | Rowitch et al. | |
| 7,768,449 B2 | 8/2010 | Gaal et al. | |
| 8,483,717 B2 | 7/2013 | Sheynblat | |
| 2002/0068584 A1* | 6/2002 | Gage et al. | 455/456 |
| 2002/0168985 A1* | 11/2002 | Zhao et al. | 455/456 |
| 2005/0015200 A1 | 1/2005 | Longhurst et al. | |
| 2006/0181452 A1* | 8/2006 | King et al. | 342/357.02 |
| 2008/0228398 A1 | 9/2008 | Syrjarinne et al. | |
| 2008/0228654 A1 | 9/2008 | Edge | |
| 2009/0280775 A1 | 11/2009 | Moeglein et al. | |

FOREIGN PATENT DOCUMENTS

| | | |
|---|---|---|
| CN | 1457563 A | 11/2003 |
| CN | 1829923 A | 9/2006 |
| CN | 101558323 A | 10/2009 |
| EP | 1798564 A2 * | 6/2007 |
| JP | 2004519892 A | 7/2004 |
| JP | 2007006081 A | 1/2007 |
| JP | 2008258833 A | 10/2008 |
| JP | 2009198391 A | 9/2009 |

(Continued)

OTHER PUBLICATIONS

International Search Report and Written Opinion—PCT/US2011/037389—ISA/EPO—Dec. 8, 2011.

*Primary Examiner* — Frank J McGue
(74) *Attorney, Agent, or Firm* — Linda Gunderson; Thomas A. Jolly (57) ABSTRACT

An almanac data management system at a location remote from a cell phone (20) has an almanac memory (44) for containing at least a current version of almanac data (52). A mobile device information memory (48) contains an identification of a version of almanac data held by the cell phone (20). A downloading system (56) selectively downloads at least a subset of the current version of almanac data (52) to the cell phone (20) if the current version of almanac data (52) is later than the version of almanac data held by the cell phone (20).

54 Claims, 4 Drawing Sheets (56) References Cited

FOREIGN PATENT DOCUMENTS

| KR | 20100037179 A | 4/2010 |
|---|---|---|
| WO | WO-9714049 | 4/1997 |
| WO | WO02067462 A1 | 8/2002 |
| WO | WO-2006029277 A1 | 3/2006 |
| WO | WO-2006102508 A1 | 9/2006 |
| WO | WO-2007082038 A1 | 7/2007 |
| WO | WO2008025013 | 2/2008 |

* cited by examiner

ALMANAC MAINTENANCE FOR MOBILE STATION POSITIONING

BACKGROUND

1. Field

The presently disclosed embodiments relate generally to systems, methods, apparatuses, and computer readable media for position location of wireless mobile devices, and more particularly to such systems, methods, apparatuses, and computer readable media for managing almanac data for use in position location functions by such devices.

2. Background

Mobile communication technologies have recently enjoyed substantial growth which is likely to continue in the future. Currently, many cars, trucks, airplanes, boats, and other vehicles are equipped with devices that allow convenient and reliable mobile communication through a network of satellite-based or land-based transceivers. Advances in this technology have also led to widespread use of hand-held, portable mobile communication devices.

Many customers of mobile communications systems also find an accurate determination of their location to be desirable. To this end, numerous location-based services have emerged. For example, services such as directions or the location of nearby facilities of a desired type may be provided based on the location information developed by the wireless device.

In the past, location information has been principally generated by satellite positioning systems (SPSs), such as the global positioning system (GPS) using NAVSTAR satellites, the Russian GLONASS system, or the European EUTELSAT system, or a land-based positioning system, such as LORAN-C. However, recent demands for faster, more accurate, and more reliable position location determination have been met with additional means to assist in, or supplant entirely, the former SPS techniques. For example, to improve the accuracy of the location information derived SPSs, or the like, fixed base stations at known locations have been used to send assistance data for mobile device use.

The use of assistance information has a number of advantages. Current cellular base stations are positioned in relatively close proximity to mobile devices in which they are in communications, as well as to adjacent or nearby other cellular base stations. The use of assistance data improves or extends the capabilities of satellite positioning systems, enabling operation in places previously not possible, since it improves time-to-fix- and sensitivity. Additionally, improved accuracy may be obtained from having more numerous and closely spaced receivers to account for atmospheric and other effects which tend to degrade the accuracy of positioning systems. Moreover, as additional base stations are deployed in the future, even more densely than current systems, they are likely to continue to provide even better resolution.

Although many of today's wireless communication standards provide for transmission of base station almanac data (BSA), currently deployed wireless base station systems typically do not broadcast their own almanac data. In general, even though the BSA data could be provided, it would not be the most effective or cost efficient technique, because it would be primarily transaction based, requested, for instance, on an ad hoc, or as-needed, basis. That is, each time a mobile device initiated a position location application or service, it would have to request the base station almanac data.

Thus, currently, BSA needs to be obtained from a location server serving the mobile devices; consequently, mobile devices must contact the server for their almanac information. In most cases, the location server does not have any way to contact the mobile devices to keep the BSA up-to-date. Although the server may have downloaded the BSA, for example, two hours ago, the server typically has no memory of that download, and the BSA must be re-downloaded when it is again needed, even if it is the same data that the mobile device already has. This, of course, takes time, bandwidth, and other resources.

SUMMARY

The embodiments disclosed herein address the above stated needs through the provision of a network server that has direct access to a source of real time base station almanac data provided by wireless network operators. This server is designed to respond to requests for base station almanac information from mobile devices in the wireless network. Based on the serving cell information provided by mobile devices making base station almanac requests, the server provides at least subsets of base station almanac data to the mobile devices. The subsets may be optimized, depending upon the application, needs, and context of the mobile devices. In doing so, the server keeps track of the data passed to each uniquely identifiable mobile device. At the same time, the server keeps track of changes in the base station almanac data provided by the network operator. By comparing the base station almanac changes to the known data subsets sent to all mobile devices, the server can determine which mobile devices need updated information, in an efficient manner that minimizes utilization of network resources.

Therefore, according to a broad aspect of one embodiment described herein, a remote station apparatus includes a location server containing current base station almanac data (BSA) and an identification of a version of BSA held by a mobile device. The location server operates to determine whether the current BSA is later than the version of BSA held by the mobile device, and, if so, to selectively push at least a subset of the current BSA to the mobile device.

According to a broad aspect of another embodiment described herein, an almanac data management system is provided at a location remote from a mobile device. The system includes an almanac memory for containing at least a current version of almanac data and a mobile device information memory for containing an identification of a version of almanac data held by the mobile device. A downloading system selectively downloads at least a subset of the current version of almanac data to the mobile device if the current version of almanac data is later than the version of almanac data held by the mobile device.

According to another broad aspect of another embodiment described herein, a method is provided for managing almanac information from a location remote from a mobile device. The method includes assigning a unique version identifier to each respective version of almanac data and maintaining at least a current version of almanac data and the unique version identifier assigned thereto. In one embodiment, the version identifier may be a reusable sequence counter that does not roll over before assuring that all almanacs of the associated mobile devices are up-to-date. The method further includes maintaining a version identifier of an almanac data version held by the mobile device. The version identifier corresponds to the version identifier that was assigned to the version of almanac data held by the mobile device. The method further includes updating at least a subset of almanac data in the mobile device if the version identifier assigned to the current version of almanac data is later than the version identifier for the version of almanac data held by the mobile device.

According to yet another broad aspect of an embodiment described herein, a computer-readable medium is provided. The computer-readable medium stores instructions that, when executed by a computer, maintain almanac data versions at a fixed location, and assign a unique version identifier to each respective almanac data version, maintain at the fixed location the identifier of a version of almanac data held by an mobile device, and an identifier of a current version of the almanac data, and update at least a subset of almanac data in the mobile device if the identifier of the current version of almanac data is later than the identifier of the version of almanac data held by the mobile device.

According to still another broad aspect of an embodiment described herein, a mobile device is provided which has a transmitter and a receiver. The device also has a memory for holding almanac data and a notification receiver for receiving a notification from a location server that the almanac data in said memory is not up-to-date. The device also has an up-to-date almanac requester for requesting up-to-date almanac data in response to the notification.

BRIEF DESCRIPTION OF THE DRAWINGS

Various embodiments are illustrated in the accompanying drawing, in which.

In the various figures of the drawing, like reference numerals are used to denote like or similar parts.

DETAILED DESCRIPTION

In order for the position of wireless mobile devices to be calculated, solutions using wireless signal measurements need some form of base station almanac (BSA) data. The BSA contains position, calibration, and other characteristics of the base stations from which wireless signals originate. A client server system is used to pass this base station almanac information to the mobile devices. The base station almanac information is not static however, but dynamic and constantly changing due to the maintenance and changing requirements of the wireless network through time. Examples of the types of events that result in changes to the BSA include turning off a base station transmitter which removes it from the network, bringing a new base station transmitter into the network, changing a parameter of a base station, or the like. Another event that results in changes to the BSA is moving a particular base station to a new physical location. Therefore the base station almanac data passed to mobile devices may quickly becomes out-of-date. Using the out-of-date information for positioning calculations results in degraded location performance.

The systems and techniques described herein place most of the control for providing updated base station almanac information in the network where changes to the base station almanac information are known. This solution places the decision logic of when to update a mobile device's BSA in the network, providing controlled server loading and updates only when they are needed and only to the mobile devices that need them.

Figure 1:
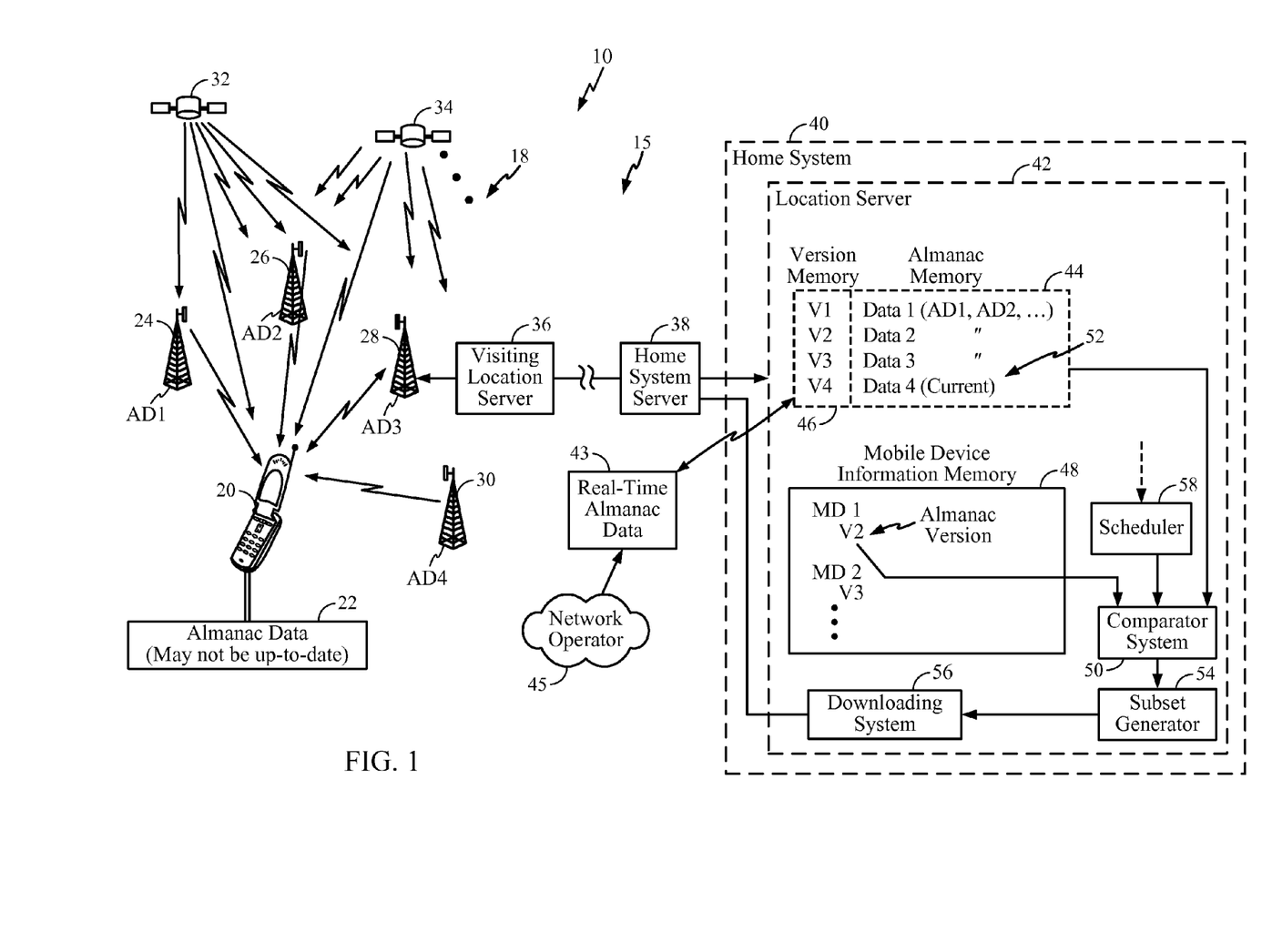
FIG. 1 is a system diagram illustrating an embodiment of an almanac data management system in a mobile network environment.

An embodiment of an almanac data management system 10 in a mobile network environment 15 is shown in FIG. 1. The mobile network environment 15 includes a region 18 in which various mobile devices, such as the cell phone 20, shown, may roam. As used herein, a "mobile device," or simply "mobile," refers to a device such as a cellular or other wireless communication device, personal communication system (PCS) device, personal navigation device (PND), personal information manager (PIM), personal digital assistant (PDA), laptop computer, or other suitable mobile device that is capable of receiving wireless communication, navigation signals, or both. The term "mobile device" is also intended to include devices that communicate with personal navigation devices (PNDs), such as by short-range wireless, infrared, wireline connection, or other connection, regardless of whether satellite signal reception, assistance data reception, or position-related processing occurs at the device or at the PND. Also, "mobile device" is intended to include all devices, including wireless communication devices, computers, laptop computers, netbooks, smartbooks, or the like, which are capable of communication with a server, such as via the Internet, Wi-Fi, or other network, and regardless of whether satellite signal reception, assistance data reception, or position-related processing occurs at the device, at a server, or at another device associated with the network. Any operable combination of the above are also considered a "mobile device."

The region 18 includes any number of base stations, four 24, 26, 28, and 30 being shown for illustration, with which a mobile device (cell phone 20) may receive signals from which its position can be determined, in known manner. The cell phone 20 is shown in two-way wireless communication with base station 28, also in known manner.

At the particular time represented in FIG. 1, a number of satellites 32, 34, . . . may be in view of the region 18, as shown. The satellites 32 and 34 are of the type that broadcast signals from which the position of a receiving station can be determined, also in known manner. The signals may include at least almanac data. Almanac data is data that includes information indicative of a position of the satellite (or other entity) originating the data. In the GPS satellite system, each satellite transmits almanac information (from which a position of each of the satellites of the GPS constellation can be determined at a particular time), as well as ephemeris information (which provides more accurate position information for the transmitting satellite). It should be noted that almanac data is not limited to position information; it may also contain, for instance, clock state information and other data associated with the relevant transmitter. It should also be noted that the almanac data may be received, for example, by a receiver (not shown) for transmission to one or more of the base stations 24, 26, 28, or 30, and rebroadcast in its original, corrected, or modified form.

In typical currently deployed wireless systems, however, the base stations 24, 26, 28, and 30 do not broadcast their own almanac data which might otherwise be used to determine the location of the cell phone 20. That almanac data, in the past, needed to be obtained from the location server.

In the mobile network environment 15 shown in FIG. 1, the cell phone 20 is shown in a "visiting" or "roaming" system away from its respective home system. This embodiment is shown for purposes of illustration, as the respective systems could just as easily could have been simply operating in its home system. Being in the roaming system, their communications to their home systems is via a visiting system server 36 associated with, for example, the base station 28. The visiting system server 36 communicates with the home system 40 through at least a home system server 38.

The cell phone 20 holds its own almanac data 22, which may or may not be up-to-date. The almanac data 22 may have been previously downloaded from a location server 42, in the home system. The location server 42, among other things, keeps track of mobile devices registered with the home system 10.

As noted above, the base station almanac information is not static, but is dynamic and constantly changing through time. The changes may be due, for example, to the maintenance and changing requirements of the wireless network in which the cell phone 20 operates. Since using the out-of-date information for positioning calculations results in degraded location performance, in order for the mobile devices to accurately determine their respective positions, the almanac data needs to be up-to-date. Thus, in the embodiment illustrated, the location server 42 has direct access to a source of real time base station almanac data 43 provided by a wireless network operator 45.

Thus, in the embodiment illustrated, the location server 42 includes an almanac memory 44 and an associated version memory 46. The version memory assigns a unique identifier to each version of the almanac data held in the almanac memory 44. Although a list of almanac data entries (data 1, data 2, data 3, data 4, etc.) with associated version indicators (v1, v2, v3, v4, etc.) are shown, in some embodiments it may be possible to save only the most recent almanac data with an associated unique identifier.

In addition, the location server 42 maintains a mobile device information memory 48 which contains, among other things, the identification of the almanac data version currently held by each mobile device registered with the home system 10. For example, in the embodiment illustrated, a mobile device designated as MD1 (cell phone 20) is shown having almanac version v2, and a mobile device designated as MD2 (not shown) is shown having almanac version v3. Both almanac versions v2 and v3 are out-of-date in the embodiment illustrated, since the current, or up-to-date almanac version 52 in the almanac memory 44 is v4.

A comparator system 50 compares the current (up-to-date) almanac data version in the version memory 44 with the current (possibly out-of-date) almanac data version of the mobile devices held in mobile device information memory 48. If, in fact, the comparator system 50 determines that the almanac data version of a mobile device is out-of-date, i.e., not matching the up-to-date almanac data version, or a subset thereof, in the almanac memory 44, the up-to-date almanac data version 52, or a subset thereof, is scheduled and pushed to the mobile device. Comparator system 50 may be implemented in a number of ways; e.g., instructions stored in memory may be executed by a processor to access the current almanac data version of one or more mobile devices and to access the almanac data version in the version memory, to execute a comparison operation, and to provide an indicator (such as a "stale version" flag) based on the outcome of the comparison operation. Comparison system 50 can also be implemented as hardware (e.g., hardware gates, etc., that in some embodiments may be integrated on one or more substrates, where the one or more substrates may include functionality for one or more of the modules described herein). Additionally, embodiments incorporating a combination of hardware and/or software and/or firmware may be used.

For efficiency, a subset of the up-to-date almanac data version 52 may be generated, for example, by an almanac data subset generator 54. One possible embodiment of an almanac data subset, for example, may include only the changed almanac data. Another embodiment may include only the changed almanac data of the base stations 24, 26, 28, and 30 in the system in which the mobile device is roaming. Other subsets will be apparent to those skilled in the art. It should also be noted that the subsets themselves can be versioned and handled in the same or similar manner as the almanac data version itself.

In some embodiments, if the entire almanac data, or all of the changes thereto, are not downloaded to the mobile device, an indicator, such as a "subset downloaded" flag, or the like, may need to be employed to ensure that necessary additional almanac data my need to be additionally downloaded, for example, if the mobile device roams into another visiting system or region. In another embodiment, a notification may be sent to the mobile device to be held in a memory, or the like, of the mobile device, and when the mobile device subsequently needs to have position location determinations made, it sends a request to the location server 42 for the up-to-date almanac data 52. This request, of course, need not be in response to a current need, but may be on a scheduled or other basis.

The up-to-date almanac data version 52, or subset thereof generated by the subset generator 54 is downloaded, in the embodiment shown, by a downloading system 56. In some implementations, downloading system 56 is configured to generate one or more messages to transmit up-to-date almanac information to cell phone 20. If a subset of the almanac data is generated, it may be necessary, in some embodiments, to save or archive previous almanac versions. In such a situation, downloading system 56 may be configured to generate one or more messages including the generated subset of up-to-date almanac data with at least some additional data. For example, if cell phone 20 has almanac data that is, say two or more, versions older than the current up-to-date almanac data, the subset that is downloaded to the cell phone 20 may include the differences of all of the almanac data from all of the previous versions, although typically the download would comprise a full data replacement of the out-of-date mobile data.

It will be appreciated that any particular home system may serve thousands of mobile devices. Consequently, it may be impractical to immediately download any changed almanac data simultaneously to all of the mobile devices served by the home system. Therefore, a scheduler 58 may be provided to initiate the download of the up-to-date almanac data 52 (or a subset thereof) to the mobile devices served. The scheduler 58, for example, may operate to initiate a download upon the occurrence of a predetermined event. For instance, a download may be initiated when a mobile device logs into a mobile network, when a mobile device makes a position location request to an application that uses position location as an input, when a mobile device requests updates, or on a time schedule in conjunction with updates to other mobile devices in the network. In one embodiment the home system server 38 may send a page or notification to those mobile devices which need updates, triggering those devices to make a request to the server. The server then responds to those requests providing the appropriate updated subsets and any new subsets required based on the current mobile serving base station.

It should be noted that although the various parts of the location server 42 are shown as being encompassed in the home system 40, the location server 42 may be located outside of the home system 40 and merely called upon, as needed. In any event, however, the status of almanac versions of the various mobile devices is known and updated by the location server 42.

Like comparator system 50, other modules shown in FIG. 1 can be implemented in software, hardware, firmware, or a combination. For example, in software implementations, data and instructions to perform the acts described above may be stored in memory and executed by one or more processors. Memory can be implemented in one or more modules, and the processor can comprise more than one processing resource. Similarly, hardware to perform the acts can be at least partially shared among the functional modules described.

Figure 2:
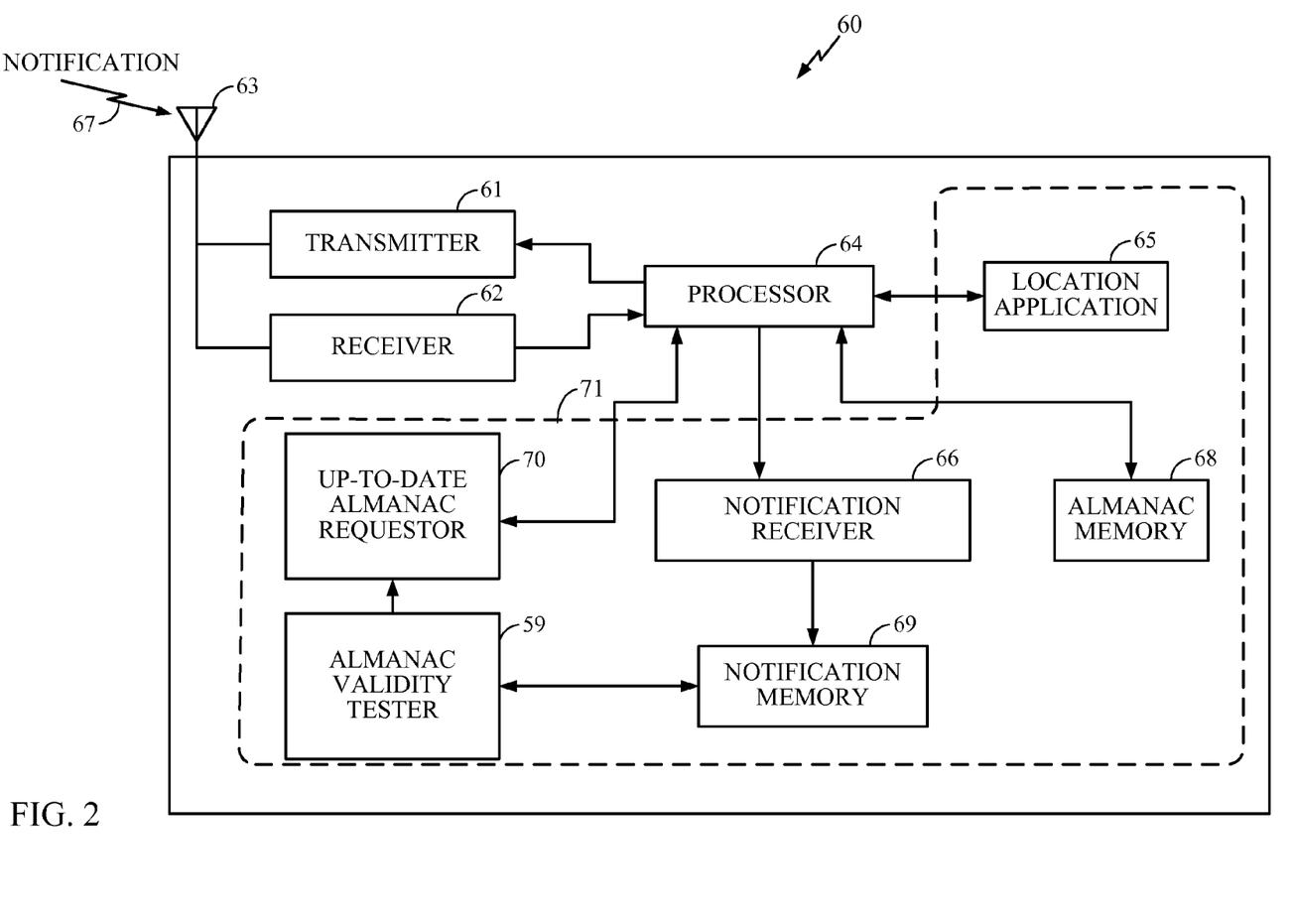
FIG. 2 is a block diagram of a mobile device embodiment for responding to a notification that its almanac data is not up-to-date.

Reference is now additionally made to FIG. 2, which shows a block diagram of a mobile device 60. The mobile device 60 may be a cell phone, such as the cell phone 20, or some other mobile device of the type described herein. The mobile device 60 includes a transmitter 61 and a receiver 62 that may be of the type normally used for radio communications in a cellular network via antenna 63. The signals in the mobile device 60 from the receiver 62 and to the transmitter 61 are controlled by one or more processors 64, also of the type described herein.

A location application 65, operates in conjunction with the processor 64 to perform specific location functions and to request location based information, including almanac information, for use in performing the particular location functions that it provides. Although the location application is shown as a part of the mobile device 60, it may alternatively be of the type that does not permanently reside in the mobile device 60. For example, the location application may be of the type that is downloaded for temporary use.

The device 60 also includes a notification receiver 66 for receiving a notification 67 from a location server, such as the location server 42 described above, that the almanac data held in almanac memory 68 is not up-to-date. The notification may be, for example, transmitted as a part of a network overhead message, or by other means. The notification may be received without regard to the operation of the location application 65, and may be initiated by the location server 42 completely independently of any operation of the mobile device 60. The fact that a notification 67 has been received is noted in a notification memory 69.

In some embodiments, location server 42 may transmit a message containing an indication of a current version identifier for almanac information. Notification receiver 66 may access the received message to determine whether it contains a notification related to almanac information (e.g., notification of a new version of almanac information). Notification information (e.g., the version number, date, or other identifier of the almanac and/or almanac subset) is then stored in notification memory 69.

An almanac validity tester 59 is provided for determining whether the almanac data is valid, or up-to-date, based on the notification noted in the notification memory 69. This determination may be made autonomously, based upon the almanac information provided by the network or location server 42. An up-to-date almanac requester 70 is provided for requesting up-to-date almanac data in response to the determination by the almanac validity tester 59 that the almanac data is not valid.

In some embodiments, when a request is made by the location application 65 for almanac data, or for data that is generated using almanac data, the almanac validity tester 59 checks the notification memory 69 to determine whether a notification 67 has been received. If a notification 67 has been received, the up-to-date almanac requester 70 transmits a request back to the location server 42 to send the up-to-date almanac data. In response, the location server 42 transmits, or causes to be transmitted, the up-to-date almanac data to be stored in the almanac memory 68. On the other hand, if the notification memory indicates that no notification 67 has been received, the up-to-date almanac requester 70 allows the location application 65 to make use of the current almanac data contained in the almanac memory 68. It should be noted that in some embodiments the up-to-date almanac requester 70 may operate on its own schedule, for example, to periodically check the notification memory 69 to determine whether a notification 67 has been received, and to operate in the manner indicated above in response to the notification state.

The various functions encircled by the dashed line 71, specifically the location application 65, the notification receiver 66, the almanac memory 68, notification memory 69, the almanac validity tester 59, and the up-to-date almanac requester 70 may be implemented in software, hardware, or combination thereof, as noted above with respect to the modules of FIG. 1. More particularly, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

The position determination techniques described herein may also be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Figure 3:
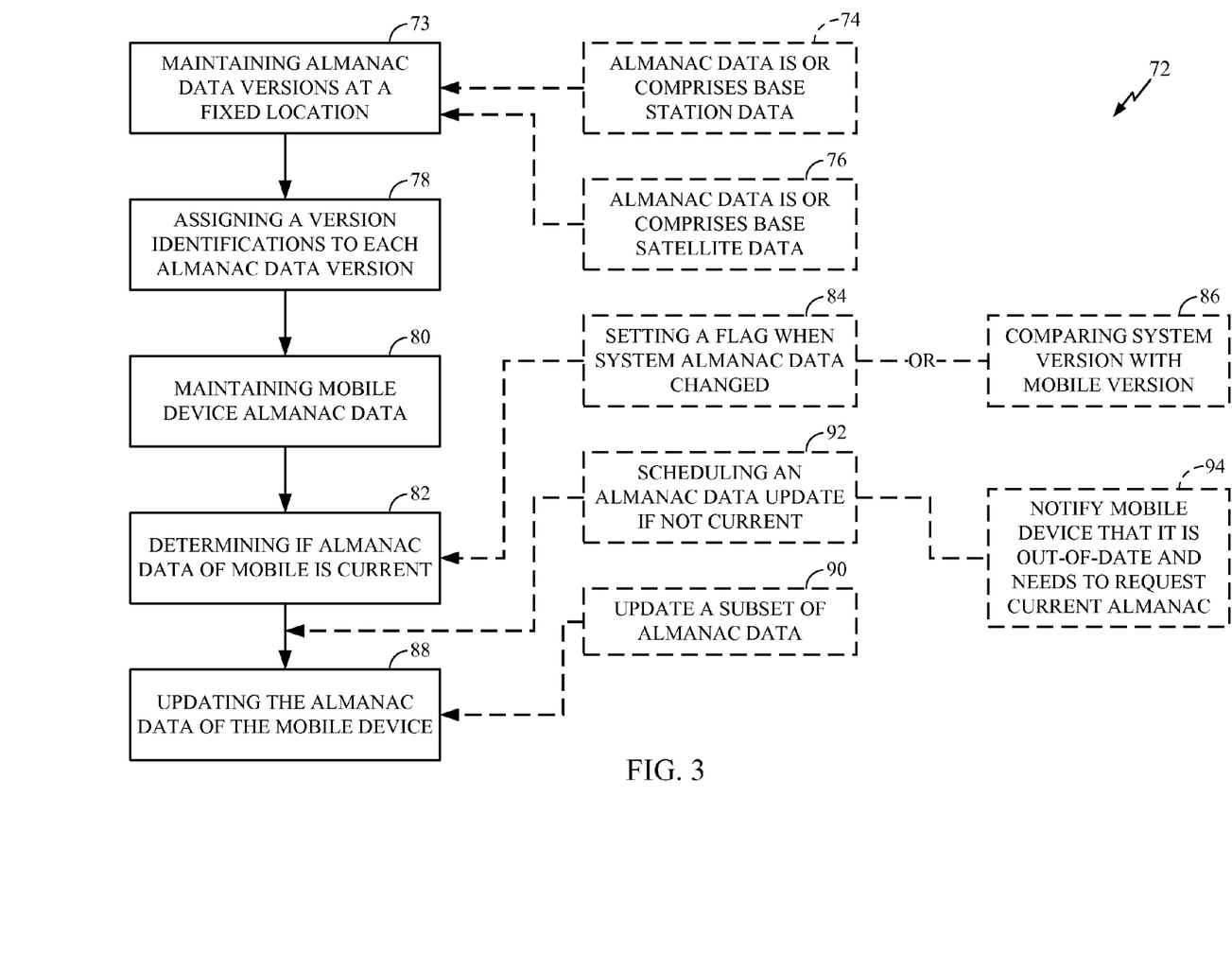
FIG. 3 is a flow diagram of various embodiments of a method for managing almanac information.

With reference now additionally to FIG. 3, a flow diagram 72 of various embodiments of methods for managing almanac information is shown. Box 73 shows maintaining almanac data versions at a fixed location. The fixed location may be, for example, a location associated with a home system 40. The term "fixed location" does not necessarily imply that the almanac data versions is maintained at a location that is not movable or mobile, but that it is at a location not co-located with the mobile devices that are served by the location server 42. Dashed-box 74 illustrates that in some embodiments the almanac information may be or comprise base station almanac data. In some embodiments the almanac data may be or comprise satellite almanac data, as shown in dashed-box 76.

Box 78 illustrates assigning unique version identifications to each almanac data version. As mentioned, it may not be necessary in some embodiments to maintain a full history list of all almanac data. The almanac data of current interest, of course, is the most current or up-to-date almanac data version.

Box 80 illustrates maintaining mobile device almanac data. Typically, this would include maintaining almanac data for a number of mobile devices that are served by the location server 40. Box 82 illustrates determining if the almanac data of the mobile device is current. As mentioned above, this may be done in some embodiments by comparing the current almanac data version in the mobile device with the up-to-date version maintained by the system (dashed-box 86). Alternatively, the fact that the almanac data held by a mobile device is not the current version may be noted whenever the almanac data in the server is updated by setting a flag for all of the mobile devices in the system (dashed-box 84), then updating the almanac data of the mobile devices on a scheduled or other basis.

Box 88 illustrates updating the almanac data in the mobile device if a current version of almanac data is later than the version of almanac data in the mobile device. As mentioned above, it may be desirable in some embodiments to update only a subset of the almanac data in the mobile device, shown in dashed-box 90. The updating steps 88 or 90 may be accomplished on a scheduled basis, as shown in dashed box 92. A scheduling embodiment is shown in box 94 in which the mobile device is notified that it is not up-to-date. In response to the notification, the mobile device requests the up-to-date almanac data when it needs to have position location determinations made.

It should be noted that for at least some of the steps described above the order of execution may be interchanged without departing from the spirit and scope of the invention. Moreover, the steps of any method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

For an implementation involving firmware and/or software, the methods and steps thereof may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. The term "computer-readable media" also includes combinations of the above. The term "computer-readable media" does not refer to propagating signals.

Figure 4:
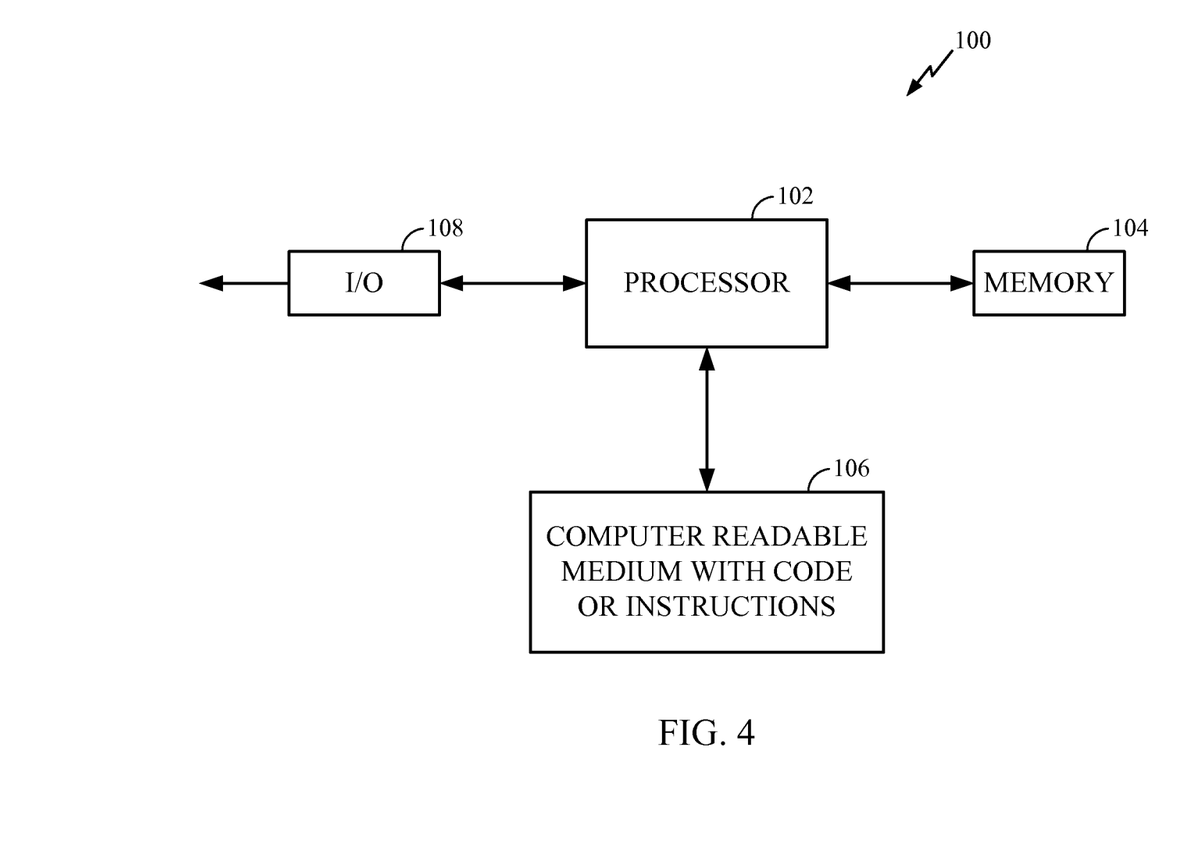
FIG. 4 is a box diagram showing an embodiment of a computer-readable medium configured to be used in conjunction with a processor for carrying out steps of at least method embodiments described herein.

A general example of an implementation 100 that comprises a computer-readable media is shown in FIG. 4, to which reference is now additionally made. The implementation 100 includes a processor 102 that communicates with a memory 104 and a computer readable medium 106 that holds code or instructions for the operation of the computer. The processor 102, memory 104, and computer readable medium 106 are of the type described herein above. An I/O device 108 is provided to enable access to and from the processor 108. It should be noted that the memory 104 and computer readable medium 106 may be implemented with a single unit, rather than discrete units shown.

Among the technical advantages provided by the various concepts described herein is the high integrity of the almanac data that is held by the mobile devices. These concepts provide one of the best ways to assure that the mobile devices have accurate and relevant almanac information, without requiring very high update rates. In GPS environments, great lengths are typically taken to assure that navigation devices have the very latest almanac information, especially in cases where a satellite fails or has a perturbation in its performance that could impact the navigation capabilities of the device. The concepts described herein enable similar capabilities for cellular mobile devices, both for terrestrial and satellite-based navigation.

Although several embodiments of the invention have been described and illustrated with a certain degree of particularity, it should be understood that the present disclosure has been made by way of example only, and that numerous changes in the combination and arrangement of parts, structures. steps, blocks, algorithms, or functions may be resorted to without departing from the spirit and scope of the invention, as hereinafter claimed.

The invention claimed is:

1. A mobile device, comprising:
   means for storing almanac data;
   means for receiving information indicative of an up-to-date almanac version from a server;
   means for determining whether said almanac data stored by said mobile device is up-to-date;
   means for requesting up-to-date almanac data in response to a notification from a server, said notification from said server to be based, at least in part, on said server comparing changes to said almanac data with a known data subset of almanac data previously transmitted to said mobile device, said known data subset including almanac data for one or more selected base stations and excluding almanac data for at least one unselected base station of a wireless communication system in which said mobile device is currently roaming; and
   means for storing said up-to-date almanac data for said one or more selected base stations in a memory.

2. The mobile device of claim 1 wherein said means for receiving information indicative of an up-to-date almanac version from said server comprises a receiver for receiving a notification from a location server that almanac data stored in said memory is not up-to-date.

3. The mobile device of claim 1 wherein said information indicative of an up-to-date almanac version comprises information indicative of a version identifier of said up-to-date almanac version.

4. The mobile device of claim 3 wherein said means for determining whether said almanac data stored by said mobile device is up-to-date comprises means for comparing a version identifier of said almanac data stored by said mobile device with said version identifier of said up-to-date almanac version.

5. A mobile device, comprising:
   a transmitter and a receiver;
   memory to store almanac data;
   means for receiving a notification from a location server that said almanac data stored in said memory is not up-to-date, said notification from said location server to be based, at least in part, on said location server comparing changes to almanac data with a known data subset of almanac data with said almanac data stored in said memory, said known data subset including almanac data for one or more selected base stations and excluding almanac data for at least one unselected base station of a wireless communication system in which said mobile device is currently roaming;
   means for storing information indicative of said notification;
   means for requesting up-to-date almanac data in response to said notification; and
   means for receiving up-to-date almanac data for said one or more selected base stations based, at least in part, on one or more base stations currently serving said mobile device.

6. The mobile device of claim 5 wherein said means for requesting up-to-date almanac data comprises means for checking whether a notification has been received.

7. The mobile device of claim 5, wherein said means for storing information indicative of said notification comprises memory coupled to a receiver to receive a notification from a location server that almanac data stored in memory is not up-to-date.

8. The mobile device of claim 5, wherein said means for receiving a notification from a location server comprises means for accessing information received from said location server by said receiver and means for processing said information received from said location server to determine if said information received from said location server includes said notification.

9. A mobile device comprising:
   a transmitter and a receiver;
   a memory to store almanac data;
   a receiver to access a received network message that said almanac data in said memory is not up-to-date;
   an validity tester to determine whether said almanac data is not current based, at least in part, on a notification received from one or more servers based, at least in part, on said one or more servers comparing changes to said almanac data with said almanac data stored in said memory; and
   an requester to request up-to-date almanac data in response to said determination, said receiver being configured to receive up-to-date almanac data for one or more selected base stations, said up-to-date almanac data excluding almanac data for at least one unselected base station of a wireless communication system in which said mobile device is currently roaming.

10. The mobile device of claim 9 wherein said network message comprises a network overhead message.

11. An apparatus, comprising:
    a location server to access current base station almanac (BSA) data and an identification of a version of BSA stored by a mobile device;
    said location server to determine whether said current BSA comprises a version different from said version of BSA stored by said mobile device, and, if so, to provide said current BSA for one or more selected base stations to said mobile device in response to a request from said mobile device, said one or more selected base stations based, at least in part, on one or more base stations serving said mobile device and excluding BSA data for at least one unselected base station of a wireless communication system in which said mobile device is currently roaming, said location server to provide said current BSA in response to, at least in part, said location server comparing changes to said BSA with a known data subset of BSA previously transmitted to said mobile device.

12. The apparatus of claim 11 wherein said location server is configured to set a flag associated with said mobile device in response to a change in said current BSA, and to clear said flag in response to providing said current BSA for said one or more selected base stations to said mobile device.

13. The apparatus of claim 11 wherein said location server provides at least a subset of said current BSA for one or more selected base stations to said mobile device on a scheduled basis if said current BSA is later than said version of BSA stored by said mobile device.

14. The apparatus of claim 11 wherein said location server provides said current BSA for one or more selected base stations to said mobile device if said current BSA is later than said version of BSA stored by said mobile device in response to requesting almanac data by said mobile device.

15. The apparatus of claim 11 wherein said location server provides said current BSA for one or more selected base stations to said mobile device in response to detecting said mobile device in a network if said current BSA is later than said version of BSA stored by said mobile device.

16. The mobile device of claim 9, wherein said changes to said almanac data comprise an indication of removal of one or more of said one or more selected base stations.

17. The mobile device of claim 9, wherein said changes to said almanac data comprise an indication of movement of at least one base station of said one or more selected base stations to a new location.

18. An almanac data management system, comprising:
memory to store a current version of almanac data;
memory to store an identification of a version of almanac data stored by a mobile device; and
one or more processors to provide said current version of almanac data to said mobile device if said current version of almanac data is later than said version of almanac data stored by said mobile device in response to said mobile device requesting up-to-date almanac data, said one or more processors to provide almanac data for one or more selected base stations based, at least in part, on one or more base stations currently serving said mobile device and excluding almanac data for at least one unselected base station of a wireless communication system in which said mobile device is currently roaming, said one or more processors providing said current version at least partially in response to on one or more servers comparing changes to said almanac data with a known data subset of said almanac data provided to said mobile device.

19. The system of claim 18, said one or more processors additionally to compare said version of almanac data stored in said mobile device with said current version of almanac data in said memory.

20. The system of claim 18 further comprising memory to store version information of said almanac data.

21. The system of claim 18, said one or more processors additionally to set a flag associated with said mobile device at least partially in response to a change in said current version of almanac data, and to clear said flag in at least partially in response to providing said changed almanac data for said one or more selected base stations to said mobile device.

22. The system of claim 18 wherein said almanac data comprises base station almanac data.

23. The system of claim 18 wherein said almanac information is base station almanac data.

24. The system of claim 18 wherein said almanac information is almanac data for a satellite positioning system.

25. The system of claim 18 further comprising a comparator to compare said almanac data version stored in said mobile device with said current version of almanac data.

26. The system of claim 18 wherein said one or more processors are additionally to provide said current version of almanac data to said mobile device on a scheduled basis.

27. The system of claim 18 wherein said one or more processors are additionally to provide said current version of almanac data to said mobile device at least partially in response to said request from said mobile device for almanac data.

28. The system of claim 18 wherein said one or more processors are additionally to provide said current version of almanac data to said mobile device at least partially in response to a detection of said mobile device in a network.

29. The almanac data management system of claim 18, wherein, said changes to said almanac data comprise an indication of removal of at least one base station from a network.

30. The almanac data management system of claim 18, wherein said changes to said almanac data comprise an indication of movement one or more base stations to a new location.

31. The system of claim 18 further comprising memory to store parameters of a home system for said mobile device.

32. An almanac data management system, comprising:
means for maintaining at least a current version of almanac data;
means for assigning a version identification to one or more almanac data versions;
means for identifying a version of almanac data stored by a mobile device;
means for updating almanac data, for one or more selected base stations, stored by said mobile device if said current version of almanac data is later than said version of almanac data stored by said mobile device in response to receiving a request for an up-to-date base station almanac (BSA) from said mobile device, said almanac data being updated at least partially in response to one or more servers comparing changes to said almanac data with a known data subset of almanac data transmitted to said mobile device, said known data subset including almanac data for one or more selected base stations and excluding almanac data for at least one unselected base station of a wireless communication system in which said mobile device is currently roaming; and
means for receiving up-to-date BSA for said one or more selected base stations based, at least in part, on said one or more base stations currently serving said mobile device.

33. The system of claim 32 wherein said almanac data comprises base station almanac data.

34. The system of claim 32 wherein said almanac data comprises almanac data for a satellite positioning system.

35. The system of claim 32 wherein said means for updating comprises means for comparing said version of almanac data stored by said mobile device with said current version of almanac data.

36. The system of claim 32 wherein said means for updating comprises means for providing, from a location remote from said mobile device, said current version of almanac data, for one or more selected base stations, to said mobile device on a scheduled basis.

37. The system of claim 32 wherein said means for updating comprises means for providing from a location remote from said mobile device said current version of almanac data, for one or more selected base stations, to said mobile device in response to one or more requests from said mobile device.

38. The system of claim 32 wherein said means for updating comprises means for providing said current version of almanac data, for one or more selected base, to said mobile device in response to detection of said mobile device in a network.

39. The system of claim 32 wherein said means for maintaining at least a current version of almanac data comprises memory for a home system for said mobile device.

40. A method for managing almanac data, comprising:
assigning a version identifier to a version of almanac data;
maintaining at least a current version of almanac data and said assigned version identifier;
maintaining a version identifier of an almanac data version stored by a mobile device, said version identifier corresponding to said version identifier assigned to said version of almanac data stored by said mobile device; and
updating almanac data in said mobile device if said version identifier assigned to said current version of almanac data is later than said version identifier for said version of almanac data stored by said mobile device and if a request for up-to-date almanac data is received, wherein said almanac data is updated for one or more selected base stations based, at least in part, on one or more base stations currently serving said mobile device, and wherein said almanac data is updated, at least in part, in response to one or more servers comparing changes to said almanac data with a known data subset of said almanac data transmitted to said mobile device, said known data subset including almanac data for one or more selected base stations and excluding almanac data for at least one unselected base station of a wireless communication system in which said mobile device is currently roaming.

41. The method for managing almanac data of claim 40 wherein said almanac data comprises base station almanac data.

42. The method for managing almanac data of claim 40 wherein said almanac data comprises almanac data for a satellite positioning system.

43. The method for managing almanac data of claim 40 wherein said updating comprises comparing said version identifier for said version of almanac data stored by said mobile device with said version identifier of said current version of almanac data.

44. The method for managing almanac data of claim 40 wherein said updating comprises providing said current version of almanac data for said one or more selected base stations to said mobile device on a scheduled basis.

45. The method for managing almanac data of claim 40 wherein said updating comprises providing said current version of almanac data for said one or more selected base stations to said mobile device in response to said request from said mobile device for up-to-date almanac data.

46. The method for managing almanac data of claim 40 wherein said updating comprises providing said current version of almanac data for said one or more selected base stations to said mobile device in response to detection of said mobile device in a network.

47. The method for managing almanac data of claim 40 wherein said method is performed at a location remote from said mobile device corresponding to a home system location for said mobile device.

48. A non-transitory medium, comprising:
instructions executable by a computer to maintain base station almanac data versions, and to assign an identifier to an almanac data version;
instructions executable by a computer to maintain said identifier of a version of almanac data stored by a mobile device, and an identifier of a current version of almanac data; and
instructions executable by a computer to update almanac data, for one or more selected base stations, in said mobile device if said identifier of said current version of almanac data is later than said identifier of said version of almanac data stored by said mobile device and if a request for an up-to-date BSA is received, wherein said one or more selected base stations correspond to one or more base stations currently serving said mobile device, and wherein said almanac data is updated, at least in part, in response comparing changes to said almanac data with a known data subset of almanac data transmitted to said mobile device, said known data subset including almanac data for one or more selected base stations and excluding almanac data for at least one unselected base station of a wireless communication system in which said mobile device is currently roaming.

49. The non-transitory medium of claim 48, further comprising instructions executable by said computer to manage at least base station almanac data.

50. The non-transitory medium of claim 48 wherein said almanac information comprises almanac data for a satellite positioning system.

51. The non-transitory medium of claim 48 further comprising instructions that are executable by said computer to compare said identifier of said version of almanac data in said mobile device with said identifier of said current version of almanac data.

52. The non-transitory medium of claim 48 wherein said instructions to update almanac data, for said one or more selected base stations, in said mobile device comprise instructions that are executable by said computer to provide said current version of almanac data for said one or more selected base stations to said mobile device on a scheduled basis.

53. The non-transitory medium of claim 48 wherein said instructions to update almanac data comprise instructions to provide said current version of almanac data for said one or more selected base stations to said mobile device in response to said mobile device requesting almanac data.

54. The non-transitory medium of claim 48 wherein said instructions to update almanac data comprise instructions to provide said current version of almanac data for said one or more selected base stations to said mobile device in response to detection of said mobile device in a network.

\* \* \* \* \*